(12) United States Patent  
Kitaguchi et al.

(10) Patent No.: US 9,363,392 B2  
(45) Date of Patent: Jun. 7, 2016

(54) IMAGE PROCESSING APPARATUS, IMAGE PROCESSING METHOD FOR THE SAME, AND RECORDING MEDIUM

(71) Applicant: KONICA MINOLTA, INC., Chiyoda-ku, Tokyo (JP)

(72) Inventors: Tatsuya Kitaguchi, Toyokawa (JP); Takanobu Sugiyama, Toyokawa (JP); Tomoyuki Atsumi, Toyohashi (JP); Takashi Oikawa, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/625,495

(22) Filed: Feb. 18, 2015

(65) Prior Publication Data

US 2015/0242720 A1   Aug. 27, 2015

(30) Foreign Application Priority Data

Feb. 26, 2014   (JP) .................................. 2014-036034

(51) Int. Cl.
| | | |
|---|---|---|
| G06F 15/00 | (2006.01) | |
| H04N 1/00 | (2006.01) | |
| G06K 15/02 | (2006.01) | |

(52) U.S. Cl.  
CPC .............. *H04N 1/00* (2013.01); *G06K 15/1886* (2013.01)

(58) Field of Classification Search  
USPC ........ 358/1.13, 468, 1.16, 1.2, 1.9, 1.17, 515, 358/517  
See application file for complete search history.

(56) References Cited

U.S. PATENT DOCUMENTS

| 5,768,486 A * | 6/1998 | Sugaya ......................... 358/1.17 |
|---|---|---|
| 2010/0241932 A1* | 9/2010 | Sakaue et al. ................. 714/784 |
| 2014/0372715 A1* | 12/2014 | Bak et al. ...................... 711/158 |
| 2015/0019834 A1* | 1/2015 | Loh et al. ...................... 711/208 |

FOREIGN PATENT DOCUMENTS

JP          2006020029 A        1/2006

* cited by examiner

*Primary Examiner* — Jerome Grant, II  
(74) *Attorney, Agent, or Firm* — Holtz, Holtz & Volek PC

(57) ABSTRACT

An image processing apparatus includes: an image input portion that inputs image data page by page; a sub memory; an encoder that encodes the image data; a main memory and a non-volatile memory; a mode judgment portion that judges a mode; and a controller that implements a first or second method depending on the judgment, the first method including: storing a part of one page on the sub memory; reserving a memory area for the one page in the main memory; storing the one page on the main memory; and reserving a memory area for next one page in the main memory, the second method including: reserving a memory area being capable of storing image data page by page in the sub memory; storing a part of image data on the main memory; storing a backup copy on the non-volatile memory; and deleting the image data from the main memory.

21 Claims, 10 Drawing Sheets

| Sub Memory | Band Buffer Memory | Behaves as a ring buffer memory. To prevent data from being overwritten, a memory area capable of storing two or more pages of image data needs to be reserved in the main memory. 15 megabytes approx. |
|---|---|---|
| | Page File Memory | Capable of storing one A3 sized page. 100 megabytes approx. |

| Main Memory | Page File Memory for Storing One Page | Behaves as a ring buffer memory when image data is input. It is necessary that a backup copy be stored on the HDD. 10 megabytes approx. for input, 90 megabytes approx. for output. |
|---|---|---|
| | Page File Memory for Storing Two or More Pages | Capable of storing n pages for input and output depending on the image processing mode. 10 to 50 megabytes approx. |

FIG.5

| No. | Resolution | Paper Size | Color Mode | Main Memory | Sub Memory | Input Method |
|---|---|---|---|---|---|---|
| 1 | High | Large | Full-color | Band by band for input One page for output | 100 megabytes (page by page) | 2 |
| 2 | High | Large | Monochrome | Three pages | 15 megabytes (band by band) | 1 |
| 3 | High | Small | Full-color | Two pages | 15 megabytes | 1 |
| 4 | High | Small | Monochrome | Four or more pages | 15 megabytes | 1 |
| 5 | Medium | Large | Full-color | Two pages | 15 megabytes | 1 |
| 6 | Medium | Large | Monochrome | Four or more pages | 15 megabytes | 1 |
| 7 | Medium | Small | Full-color | Four or more pages | 15 megabytes | 1 |
| 8 | Medium | Small | Monochrome | Four or more pages | 15 megabytes | 1 |
| 9 | Low | Large | Full-color | Four or more pages | 15 megabytes | 1 |
| 10 | Low | Large | Monochrome | Four or more pages | 15 megabytes | 1 |
| 11 | Low | Small | Full-color | Four or more pages | 15 megabytes | 1 |
| 12 | Low | Small | Monochrome | Four or more pages | 15 megabytes | 1 |

FIG.8

IMAGE PROCESSING APPARATUS, IMAGE PROCESSING METHOD FOR THE SAME, AND RECORDING MEDIUM

This application claims priority under 35 U.S.C. §119 to Japanese Patent Application No. 2014-036034 filed on Feb. 26, 2014, the entire disclosure of which is incorporated herein by reference in its entirety.

BACKGROUND OF THE INVENTION

1. Field of the Invention

The present invention relates to: an image processing apparatus such as a multi-function peripheral (MFP), i.e., a multifunctional digital image forming apparatus; an image processing method for the image processing apparatus; and a non-transitory computer-readable recording medium storing an image processing program for the image processing apparatus to implement the image processing method.

2. Description of the Related Art

The following description sets forth the inventor's knowledge of related art and problems therein and should not be construed as an admission of knowledge in the prior art.

There is a high-speed scanner for image processing apparatuses and once such a high-speed scanner starts image input, it cannot stop the operation until it is finished. Therefore, in preparation for image input, it is necessary to reserve a memory area equivalent to one page of compressed and encoded image data in a memory.

There are the following types of memory for image processing apparatuses: a main memory that allows free accesses from a CPU and can be expanded with extra memory as the need arises; a sub memory that allows only direct memory accesses (DMA) and has as much memory area only as the device configuration needs; and a non-volatile backup memory device for storing great size of encoded data.

Main memory is more expensive than sub memory because of its optional feature, i.e., memory expansion. In order to reserve a band wide enough for image transfer, a configuration needs to be made such that a main memory and a sub memory are accessed through different channels.

When a memory area equivalent to one page of image data is reserved in a main memory, a scanner can perform quick image inputs with an automatic document feeder installed thereon. Since the performance of an automatic document feeder determines the size of a memory area to be reserved in a main memory, it is very common to expand a main memory with extra memory for quick image inputs.

For example, there are image processing apparatuses provided with a dual scan-enabled automatic document feeder; some of them are configured to reserve a memory area equivalent to four A3 sized pages of image data in their main memories. There are other image processing apparatuses provided with a normal automatic document feeder; most of them are configured to reserve a memory area equivalent to two A3 sized pages of image data in their main memories.

Being provided with an expanded main memory, such an image processing image apparatus can reserve a memory area for storing image data quickly and the automatic document feeder can perform a quick document scan. Also, image data can be decompressed quickly from the expanded main memory in preparation for image output. That is, a quick image input and output can be performed concurrently.

In contrast, cost-saving image processing apparatuses must be provided with a main memory of a small size. When a memory area equivalent to one A3 sized page of image data can be reserved in a main memory, the main memory is of a size as small as possible.

After one page of image data input from a scanner is stored on a main memory of a small size, image input on a next page cannot be started unless a backup copy of that page is stored on a backup memory device. While performing image input, image data cannot be read out from the backup memory device in preparation for image output, which negatively and significantly affects its performance.

As a solution to the problem, a sub memory having a paging buffer can be employed. With such a sub memory, a backup copy of encoded data can be stored band by band on the backup memory device quickly and image input on a next page can be started quickly. Furthermore, a memory area for storing image data page by page can be reserved quickly in the main memory of a small size and thus image data can be obtained quickly from the backup memory device in preparation for image output. That is, quick image inputs and outputs can be performed concurrently without the need for a main memory of a large size.

As described above, an image data input method implemented for the image processing apparatus provided with the main memory of a small size includes: reserving a memory area capable of storing image data page by page in the sub memory when image data is input from the scanner, for example; temporarily storing encoded image data from the sub memory band by band on the main memory; further storing a backup copy of the encoded image data on the non-volatile backup memory device; deleting the same from the main memory; and reserving a memory area for storing image data page by page in the main memory in preparation for image output.

Japanese Unexamined Patent Publication No. 2006-020029 discloses: an image input and output device provided with an image output portion that cannot stop its operation until it is finished, which is characterized by reserving a memory area for storing encoded data page by page in its encoded data memory and reserving memory area for storing bitmap data band by band in its bitmap data memory; and an image input and output device provided with an image output portion that can stop its operation while it is active, which is characterized by reserving a memory area for storing encoded data band by band in its encoded data memory and reserving memory area for storing bitmap data band by band in its bitmap data memory.

The above-described image data input method, which includes: reserving a memory area capable of storing image data page by page in its sub memory; temporarily storing image data band by band on its main memory; and reserving a memory area for storing image data page by page on its main memory in preparation for image output, can be implemented for an image processing apparatus provided with such an image input and output device as well as a main memory of a small, which causes the following problem.

The size of memory areas to be reserved in the main memory and the sub memory is determined such that the memory areas can store maximum sized pages of image data. In other words, it is determined such that the maximum level is guaranteed, which may cause a large free memory area in the main memory and the sub memory depending on the image processing mode. For example, when a low-resolution image is input, only a small memory area for storing image data page by page is reserved and a large free memory area may be left in the main memory and the sub memory.

In this case, an alternative image data input method, which includes reserving a memory area equivalent to one page of image data in the main memory, can be implemented for quick image inputs. Despite the presence of the alternative, it is really wasteful that the image input and output device cannot make full use of its resources in the image data input method, which includes: reserving a memory area for storing image data page by page in the sub memory; reserving a memory area for storing image data band by band in the main memory; and storing a backup copy on the backup memory device.

Japanese Unexamined Patent Publication No. 2006-20029 does not teach any technique that can bring a solution to the above-described problem.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus including:
  an image input portion that inputs image data page by page;
  a sub memory that stores the image data being input by the image input portion;
  an encoder that encodes the image data being stored on the sub memory;
  a main memory that stores the image data being encoded by the encoder, the image data being stored on the sub memory;
  a non-volatile memory that stores the encoded image data, the encoded image data being stored on the main memory;
  a mode judgment portion that judges a current configured image processing mode; and
  a controller that implements a first input method or a second input method depending on the judgment on the current configured image processing mode, the judgment being obtained by the mode judgment portion, the first input method comprising: storing a part of one page of image data on the sub memory, the image data being input by the image input portion; reserving a first memory area in the main memory, the first memory area being capable of storing the one page of image data; storing the one page of image data on the main memory, the image data being stored on the sub memory and encoded by the encoder; and reserving a second memory area in the main memory, the second memory area being capable of storing a next one page of image data, the second input method comprising: reserving a third memory area in the sub memory, the third memory area being capable of storing image data page by page, the image data being input by the image input portion; temporarily storing a part of image data on the main memory, the image data being stored on the sub memory and encoded by the encoder; storing a backup copy of the image data on the non-volatile memory, the image data being temporarily stored on the main memory; and deleting the image data temporarily stored on the main memory.

A second aspect of the present invention relates to an image processing method for an image processing apparatus, the image processing method including:
  inputting image data page by page;
  storing the image data on a sub memory, the image data being input page by page;
  encoding the image data being stored on the sub memory;
  storing the encoded image data on a main memory, the image data being stored on the sub memory;
  storing a backup copy of the encoded image data on a non-volatile memory, the encoded image data being stored on the main memory;
  judging a current configured image processing mode; and
  implementing a first input method or a second input method depending on the judgment on the current configured image processing mode, the first input method comprising: storing a part of one page of image data on the sub memory, the image data being input; reserving a first memory area in the main memory, the first memory area being capable of storing the one page of image data; storing the one page of image data on the main memory, the image data being stored on the sub memory and encoded; and reserving a second memory area in the main memory, the second memory area being capable of storing a next one page of image data, the second input method comprising: reserving a third memory area in the sub memory, the third memory area being capable of storing image data page by page, the image data being input; temporarily storing a part of image data on the main memory, the image data being stored on the sub memory and encoded; storing a backup copy of the image data on the non-volatile memory, the image data being temporarily stored on the main memory; and deleting the image data temporarily stored on the main memory.

A third aspect of the present invention relates to a non-transitory computer-readable recording medium having an image processing program stored thereon, the image processing program making a computer of an image processing apparatus execute:
  inputting image data page by page;
  storing the image data on a sub memory, the image data being input page by page;
  encoding the image data being stored on the sub memory;
  storing the encoded image data on a main memory, the image data being stored on the sub memory;
  storing a backup copy of the encoded image data on a non-volatile memory, the encoded image data being stored on the main memory;
  judging a current selected image processing mode; and
  implementing a first input method or a second input method depending on the judgment on the current configured image processing mode, the first input method comprising: storing a part of one page of image data on the sub memory, the image data being input; reserving a first memory area in the main memory, the first memory area being capable of storing the one page of image data; storing the one page of image data on the main memory, the image data being stored on the sub memory and encoded; and reserving a second memory area in the main memory, the second memory area being capable of storing a next one page of image data, the second input method comprising: reserving a third memory area in the sub memory, the third memory area being capable of storing image data page by page, the image data being input; temporarily storing a part of image data on the main memory, the image data being stored on the sub memory and encoded; storing a backup copy of the image data on the non-volatile memory, the image data being temporarily stored on the main memory; and deleting the image data temporarily stored on the main memory.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 5 shows an explanatory table of memory areas to be reserved in a sub memory in the first and second input methods and an explanatory table of memory areas to be reserved in a main memory in the first and second input methods;

FIG. 8 shows an explanatory table of image processing modes in relation to memory areas to be reserved in the main memory and the sub memory and image data input methods to be determined for the image processing modes;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
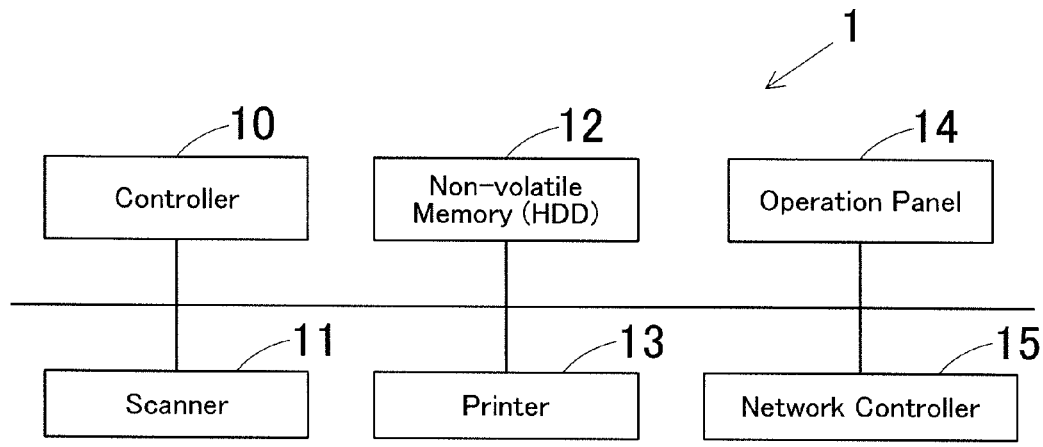
FIG. 1 is a block diagram illustrating a basic configuration of an image processing apparatus according to one embodiment of the present invention.

FIG. 1 is a block diagram illustrating a basic configuration of an image processing apparatus 1 according to one embodiment of the present invention. In this embodiment, a MFP, i.e., a multifunctional digital image forming apparatus having various functions such as a copier function, a printer function, and a scanner function, as described above, is employed as the image processing apparatus 1.

The image processing apparatus 1 is provided with: a controller 10; a scanner 11; a non-volatile memory 12; a printer 13; an operation panel 14; a network controller (NIC) 15; and others.

The controller 10 controls the entire image processing apparatus 1 in a unified and systematic manner such that users can use basic functions of the image processing apparatus 1, such as a copier function, a printer function, a scanner function, and a facsimile function. Furthermore, the controller 10 inputs image data obtained from a document by the scanner 11, page by page, which will be later described in details.

The scanner 11 is an image input device for converting a document image into an image file format by reading a sheet of paper put on a platen (not shown in this figure) and by sequentially reading sheets of paper conveyed by an automatic document feeder (not shown in this figure) referred to as ADF.

The non-volatile memory 12 is comprised of a non-volatile memory device such as a hard disk drive (HDD). The non-volatile memory 12 stores image data obtained from a document by the scanner 11, input and processed by the controller 10, data received from other image processing apparatuses and user terminals, various applications, and others. The non-volatile memory 12 protects image data in case of a power failure because of its characteristics as a non-volatile memory device.

The printer 13 prints image data obtained from a document by the scanner 11, print data received from user terminals, and others in a specified print mode.

The operation panel 14 is used for user inputs and other manipulations. The operation panel 14 is provided with: a display that is comprised of a liquid-crystal display with touch-panel functionality for displaying messages, operation screens, and others; and a key input section that is provided with a numeric keypad; a start key; a stop key; and other keys.

The network controller 15 maintains data transmission and receipt by controlling communication with external apparatuses on the network, such as other image processing apparatuses and user terminals.

Figure 2:
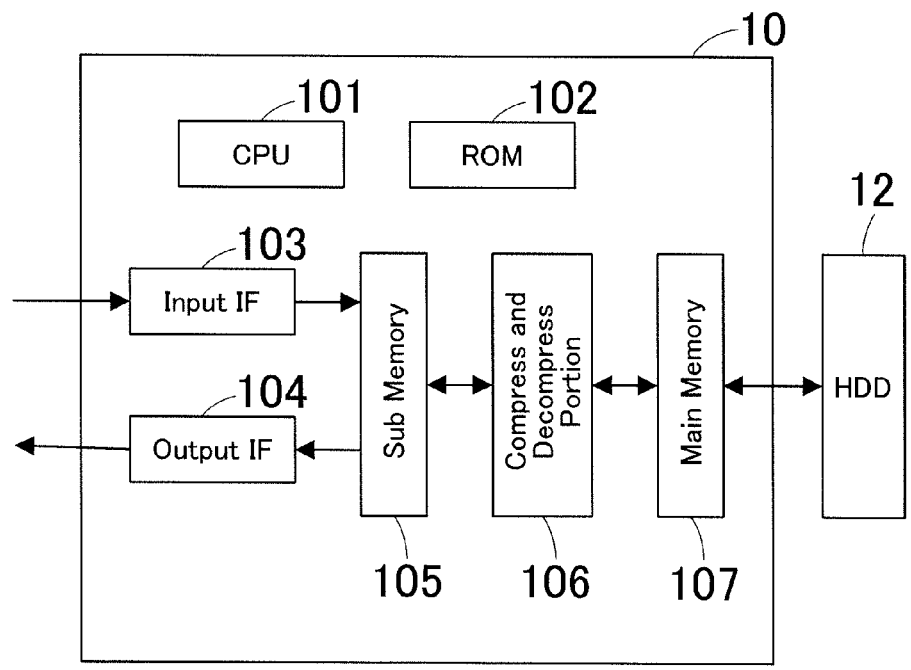
FIG. 2 is a block diagram illustrating a configuration of a controller.

FIG. 2 is a block diagram illustrating a configuration of the controller 10.

The controller 10 is provided with: a CPU 101; a ROM 102; an input interface (referred to as input IF in this FIG. 103; an output interface (referred to as output IF in this FIG. 104; a sub memory 105; a compress and decompress portion 106; a main memory 107; and others.

The CPU 101 controls the entire image processing apparatus 1 in a unified and systematic manner in accordance with operation programs stored on a memory such as the ROM 102. In this embodiment, under the control of the CPU 101, image data obtained from a document by the scanner 11 is input and processed. Specifically, under the control of the CPU 101, the following operations are performed: a memory area is reserved in the main memory 107 and the sub memory 105 and image data is written in and read out therefrom; image data is written in and read out from the non-volatile memory 12; image data is deleted from the main memory 107; and image data is compressed (encoded) and decompressed (decoded) by the compress and decompress portion 106. Furthermore, the CPU 101 serves to judge a user's configured image processing mode, e.g., a user's selected read resolution, paper size, full-color or monochrome mode, and others.

The RAM 102 is a memory that stores operation programs for the CPU 101 and other data.

The input interface 103 receives image data from the scanner 11 and others to transfer to the sub memory 105; the output interface 104 transfers image data stored on the non-volatile memory 12 comprised of a HDD, for example, to transfer outside the controller 11.

The sub memory 105 temporarily stores image data input outside the controller 10 to output outside the controller 10; the sub memory 105 serves as a buffer memory. The sub memory 105 allows only direct memory accesses (DMA) and has as much memory area only as the device configuration needs.

The compress and decompress portion 106 compresses input image data in a predetermined format and decompresses compressed image data read out from the non-volatile memory 12.

The main memory 107 temporarily stores image data compressed by the compress and decompress portion 106 and compressed image data read out from the non-volatile memory 12. The main memory 107 allows free accesses from the CPU 101 and can be expanded with extra memory as the need arises. As is commonly recognized, the main memory 107 is more expensive than the sub memory 105.

In this embodiment, from the perspective of cost reduction and others, the image processing apparatus 1 is provided with the main memory 107 of a small size, e.g., about 100 megabytes. With the main memory 107 of a small size as described above, the image processing apparatus 1 is preferably configured to input image data to the controller 10 in a specific input method to be described below (this will be referred to as Input Method 2 ).

Description of Input Method 2

Figure 3:
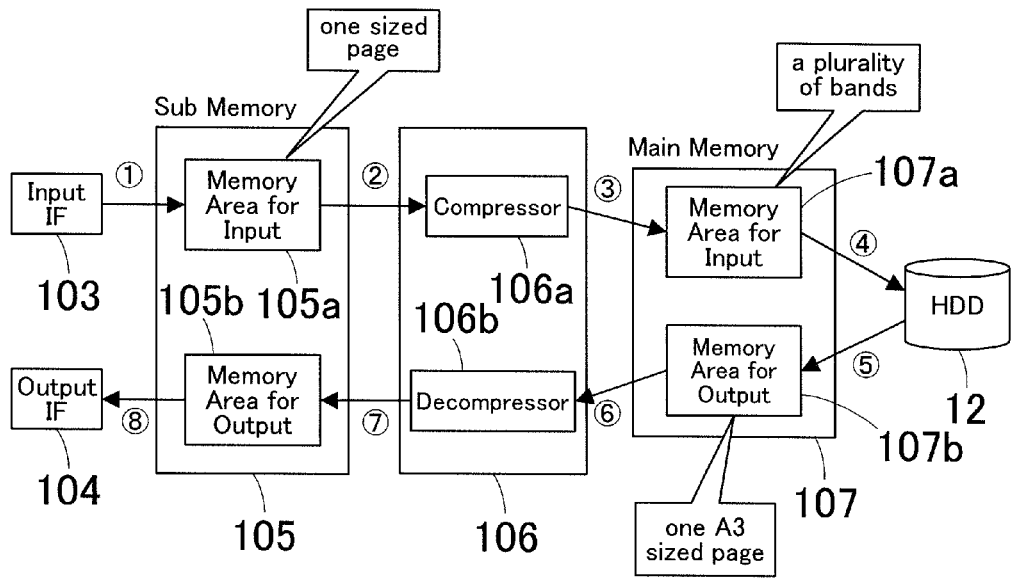
FIG. 3 is an explanatory view of operations of the controller in a second input method.

The sub memory 105 serves as a paging buffer memory in this method. As illustrated in FIG. 3, a memory area 105a capable of storing one maximum sized page of image data input via the input interface 103 (approximately 100 megabytes, for example) is reserved in the sub memory 105.

Meanwhile, the main memory 107 serves as a paging file memory that behaves as a ring buffer memory when image data is input; a memory area 107a capable of storing a plurality of bands of image data, whose size is approximately 10 megabytes, for example, is reserved for image input in the main memory 107. Furthermore, a memory area 107b capable of storing one maximum sized page of image data (approximately 90 megabytes) is reserved for image output in the main memory 107. Under the control of the CPU 101, the following operations are performed: image data partially stored on the sub memory 105 is compressed by a compressor 106a of the compress and decompress portion 106; the compressed image data is temporarily stored band by band on the main memory 107; a backup copy of the compressed image data is stored on the non-volatile memory 12; and the compressed image data is deleted from the main memory 107. When the image data stored on the non-volatile memory 12 needs to be output for printing, for example, it is read out from the non-volatile memory 12 page by page and written in the memory area 107b of the main memory 107, decompressed by a decompressor 106b of the compress and decompress portion 106, and output via a memory area 105b of the sub memory 105, which is for image output. The above-described sequence of operations is indicated by arrows with numbers in FIG. 3.

In this embodiment, a maximum sized page of image data is defined as an A3 sized page.

In Input Method 2, while a memory area capable of storing about one maximum sized page of image data is reserved in the main memory 107, the sub memory 105 serves as a paging buffer memory: there is no memory contention between image input and output any more. As a result, the image processing apparatus achieves in performing document scans and printings concurrently at a guaranteed minimum speed. In this method, as described above, it is necessary that a backup copy of image data be stored on the non-volatile memory 12 after being temporarily stored on the main memory 107.

Input Method 2 is a conventional image data input method that is normally implemented not depending on the current configured image processing mode. Conventionally, Input Method 2 is only one option even in a case where quick image inputs can be performed, i.e., even in a case where a memory area equivalent to a plurality of pages of image data can be reserved in the main memory 107 because each page has a small size. The image processing apparatus cannot make full use of its resources in Input Method 2.

As a solution to the problem, this embodiment is configured such that a different input method is determined depending on the current configured image processing mode. In other words, Input Method 1 to be described below is determined in a case where a memory area equivalent to a plurality of pages of image data can be reserved in the main memory 107 because each page has a small size.

Description of Input Method 1

Figure 4:
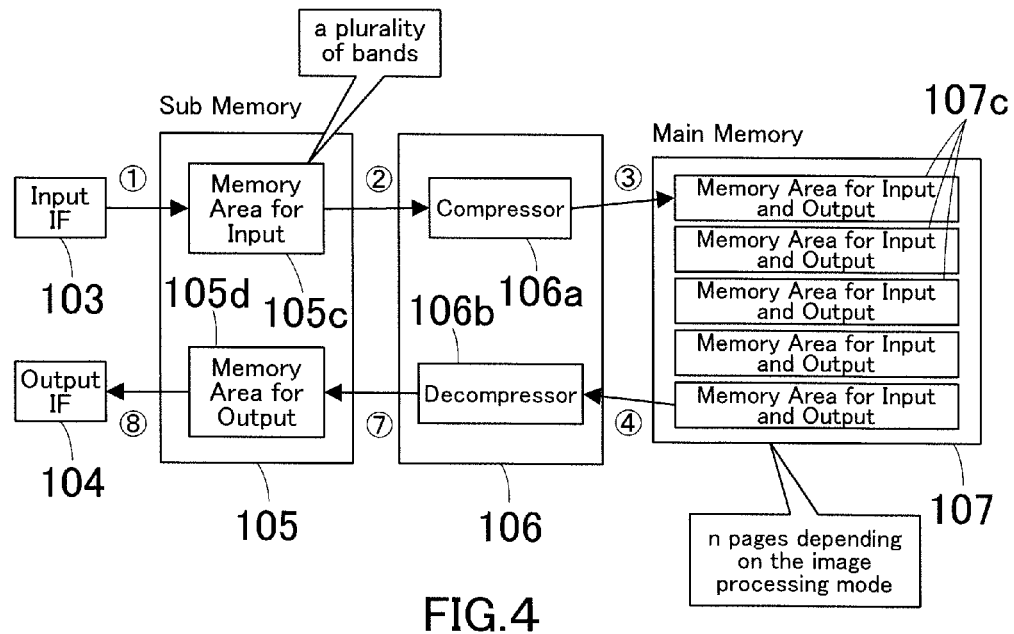
FIG. 4 is an explanatory view of operations of the controller in a first input method.

The sub memory 105 serves as a band buffer memory that behaves as a ring buffer in this method. As illustrated in FIG. 4, one page of image data input via the interface 130 is stored band by band on a memory area 105c and transferred to the compress and decompress portion 106. As a matter of course, the memory area 105c, which is capable of partially storing one page of image data, is reserved in the sub memory 105.

Meanwhile, on the basis of the current configured image processing mode, a memory area 107c capable of storing one page of image data is reserved in the main memory 107 and the image data compressed by the compress and decompress portion 106 is stored on the reserved memory area 107c. Furthermore, another memory area 107c capable of storing next one or more pages of image data is reserved in the main memory 107. That is, the main memory 107 serves as a paging file memory having a paging file equivalent to two or more pages of image data; a set of memory areas 107c, which is equivalent to n pages (n is equal to or greater than 2) of image data (approximately 10 to 50 megabytes), is reserved for both image input and output in the main memory 107. The above-described sequence of operations is indicated by arrows with numbers in FIG. 4.

In Input Method 1, a set of memory areas 107c, which is capable of storing two or more pages of image data is reserved in the main memory 107: there is no memory contention between image input and output any more. As a result, the image processing apparatus achieves in performing document scans and printings concurrently at a guaranteed minimum speed.

Specifically, the set of memory areas 107c reserved in the main memory 107 may be capable of storing four or more pages of image data; in such a case, the image processing apparatus has an equal performance to an image processing apparatus equipped with the main memory 107 of a large size, achieving in executing multiple jobs concurrently without lowering its performance.

FIG. 5 shows a table containing memory areas to be reserved in the sub memory 105 in Input Methods 1 and 2 and a table containing memory areas to be reserved in the main memory 107 in Input Methods 1 and 2.

As indicated in this table, the sub memory 105 serves as a band buffer memory or a paging buffer memory depending on the image data input method. When the sub memory 105 serves as a band buffer memory that behaves as a ring buffer memory, a memory area of approximately 15 megabytes is reserved in the sub memory 105. To prevent data from being overwritten, a memory area capable of storing two or more pages of image data needs to be reserved in the main memory 107. That is, the main memory 107 serves as a paging file memory capable of storing two or more pages of image data; a set of memory areas 107c, which is equivalent to n pages (n is equal to or greater than 2) of image data (approximately 10 to 50 megabytes) depending on the image processing mode, is reserved for both image input and output in the main memory 107. The reserved set of memory areas 107c is indicated in FIG. 4 for Input Method 1.

When the sub memory 105 serves as a paging buffer memory having a paging buffer equivalent to one page of image data, a memory area 105a capable of storing one maximum sized (A3 sized) page of image data (approximately 100 megabytes, for example) is reserved in the sub memory 105. In this case, the main memory 107 serves as a paging file memory that behaves as a ring buffer memory when image data is input; a memory area 107a capable of storing a plurality of bands of image data, whose size is approximately 10 megabytes, for example, is reserved for image input in the main memory 107. In this method, it is necessary that a backup copy of image data be stored on the non-volatile memory 12 after being temporarily stored on the main memory 107. Furthermore, a memory area 107b capable of storing one maximum sized page of image data (approximately 90 megabytes) is reserved for image output in the main memory 107. The reserved memory area 107c is indicated in FIG. 3 for Input Method 2.

Hereinafter, operations of the image processing apparatus 1 will be described.

Figure 6:
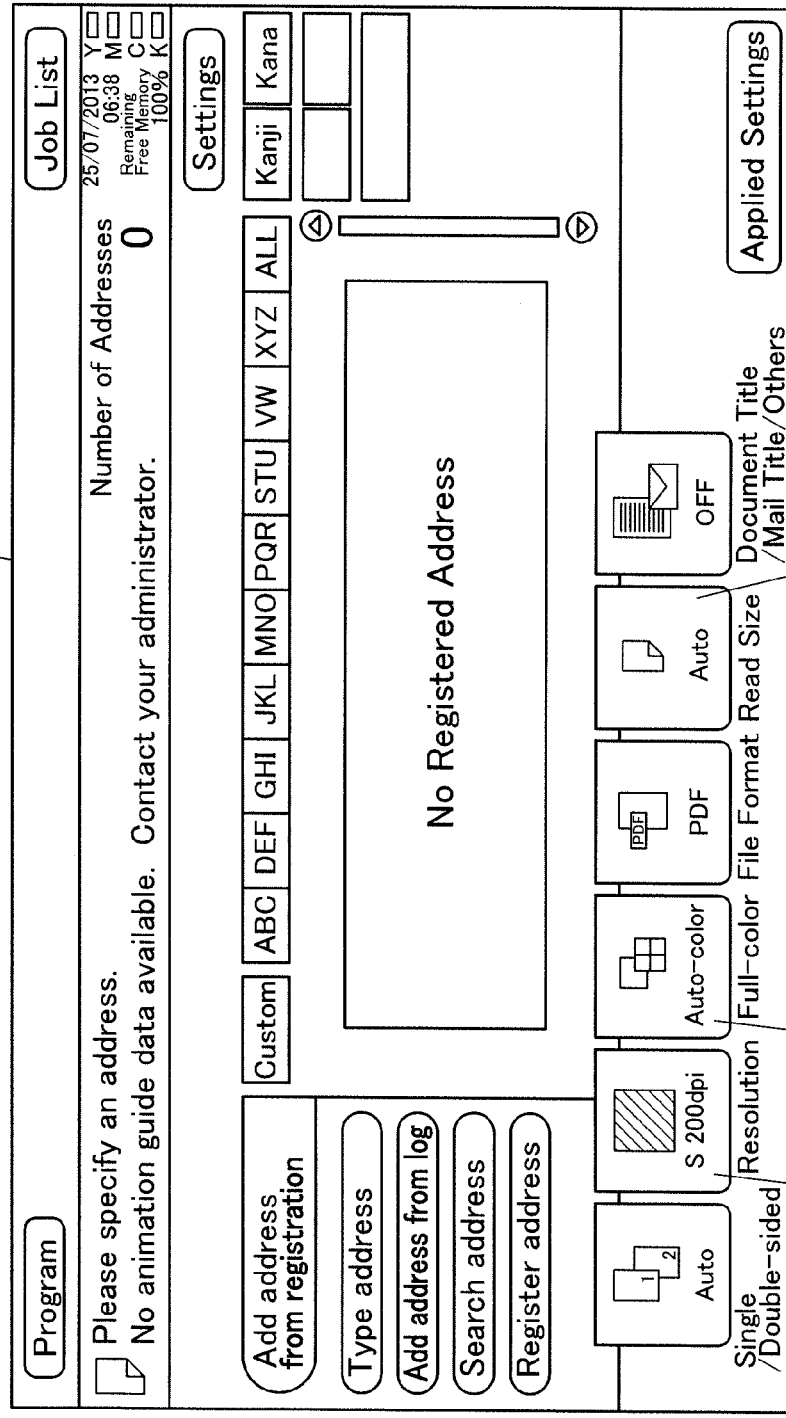
FIG. 6 illustrates an operation screen.

To print image data generated by the scanner 11 that performs document scan, users specify a read resolution, a paper size, and a print color mode (full-color or monochrome mode) by operating an operation screen displayed on the operation panel 14 as illustrated in FIG. 6. The operation screen of FIG. 6 shows a resolution setting button 141, a full-color/monochrome mode setting button 142, and a paper size setting button 143. By operating these buttons, users can configure an image processing mode.

Figure 7:
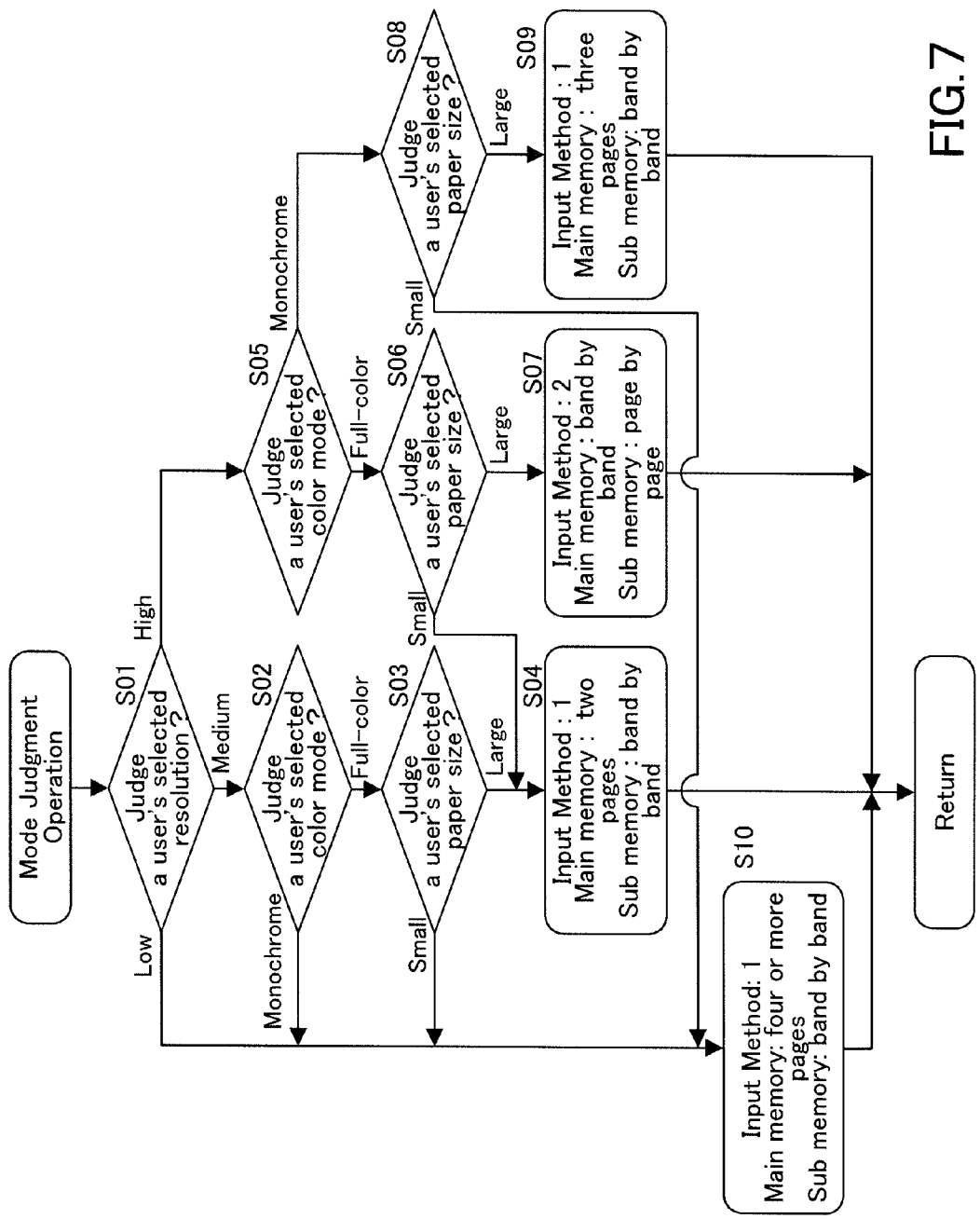
FIG. 7 is a flowchart representing a mode judgment operation to be performed by the image processing apparatus.

FIG. 7 is a flowchart representing an operation of judging a user's configured image processing mode and determining memory areas (allocating memory areas) in the main memory 107 and the sub memory 105 on the basis of the judgment on the image processing mode.

The operations represented by the flowcharts of FIG. 7 and the following figures are executed by the CPU 101 in accordance with operation programs stored on a recording medium such as the ROM 102.

In Step S01, a user's selected resolution is judged by the CPU 101. In this embodiment, three levels of resolution are defined in advance as high, medium, and low, on the basis of the value of resolution. Two levels of resolution may be alternatively defined in advance as high and low.

If a user's selected resolution is judged to be low ("Low" in Step S01), the routine proceeds to Step S10. If a user's selected resolution is judged to be medium ("Medium" in Step S01), then a user's selected color mode is judged in Step S02. If it is judged to be monochrome ("Monochrome" in Step S02), the routine proceeds to Step S10; if it is judged to be full-color ("Full-color" in Step S02), then a user's selected paper size is judged in Step S03. A user's selected paper size is judged to be large upon being the same as or greater than a predetermined size; a user's selected paper size is judged to be small upon being smaller than a predetermined size.

If the paper size is judged to be small ("Small" in Step S03), the routine proceeds to Step S10. In Step S10, the followings are determined; an input method is Input Method 1; a memory area equivalent to four or more pages of image data is reserved in the main memory 107; and a memory area for storing image data band by band is reserved in the sub memory 105. After this step, the routine returns.

If the paper size is judged to be large ("Large" in Step S03), the routine proceeds to Step S04, in which the followings are determined; an input method is Input Method 1; a memory area equivalent to two pages of image data is reserved in the main memory 107; and a memory area for storing image data band by band is reserved in the sub memory 105. After this step, the routine returns.

Back to Step S01, if a user's selected resolution is judged to be high ("High" in Step S01), then a user's selected color mode is judged in Step S05. If it is judged to be full-color ("Full-color" in Step S05), then a user's selected paper size is judged in Step S06.

If the paper size is judged to be small ("Small" in Step S06), then an input method and others are determined in Step S04. If the paper size is judged to be large ("Large" in Step S06), the routine proceeds to Step S07, in which the followings are determined; an input method is Input Method 2; a memory area for storing image data band by band is reserved in the main memory 107; and a memory area for storing image data page by page is reserved in the sub memory 105. After this step, the routine returns.

Back to Step S05, if a user's selected mode is judged to be monochrome ("Monochrome" in Step S05), then a user's selected paper size is judged in Step S08. If the paper size is judged to be small ("Small" in Step S08), then an input method and others are determined in Step S10. If the paper size is judged to be large ("Large" in Step S08), the routine proceeds to Step S09, in which the followings are determined; an input method is Input Method 1; a memory area equivalent to three pages of image data is reserved in the main memory 107; and a memory area for storing image data band by band is reserved in the sub memory 105. After this step, the routine returns.

FIG. 8 is a table containing combinations of the judgments on a resolution, a paper size, and a color mode in relation to input methods to be determined and memory areas to be reserved for the combinations.

As is understood from the table of FIG. 8, if it is a combination of a resolution judged to be high, a paper size judged to be large, and a color mode judged to be full-color (the record No. 1 in FIG. 8), it is anticipated that a great size of image data will be input. Thus, the sub memory 105 serves as a paging buffer memory having a paging buffer equivalent to one page of image data, a memory area for storing image data band by band is reserved for image input in the main memory 107, and a memory area equivalent to one page of image data is reserved for image output in the main memory 107. Furthermore, Input Method 2 is selected.

If it is a combination including at least one of a resolution judged to be low or medium (the records No. 5 to 12 in FIG. 8), a paper size judged to be small (the records No. 3, 4, 7, 8, 11, and 12 in FIG. 8), and a color mode judged to be monochrome (the records No. 2, 4, 6, 8, 10, and 12 in FIG. 8), it is anticipated that a small size of image data will be input. Thus, a memory area for storing image data band by band is reserved in the sub memory 105 and a memory area equivalent to two or more pages of image data is reserved in the main memory 107. Furthermore, Input Method 1 is selected.

If it is a first combination of a resolution judged to be high, a paper size judged to be small, and a color mode judged to be full-color (the record No. 3 in FIG. 8) or a second combination of a resolution judged to be medium, a paper size judged to be large, and a color mode judged to be full-color (the record No. 5 in FIG. 8), a memory area equivalent to two pages of image data is reserved in the main memory 107.

If it is a third combination of a resolution judged to be high, a paper size judged to be large, and a color mode judged to be monochrome (the record No. 2 in FIG. 8), a memory area equivalent to three pages of image data is reserved in the main memory 107.

If it is not the first, second, or third combination, a memory area equivalent to four or more pages of image data is reserved in the main memory 107.

A different image data input method is determined depending on the size of image data to be input, which is anticipated from the image processing mode, as described above. In this way the image processing apparatus achieves quick image inputs without sacrificing making full use of its resources.

Furthermore, even if the input method is same Input Method 1, a different size of memory area, which is equivalent to different number of pages of image data, is reserved in the main memory 107 depending on the image processing mode. In this way the image processing apparatus achieves still quicker image inputs.

Figure 9:
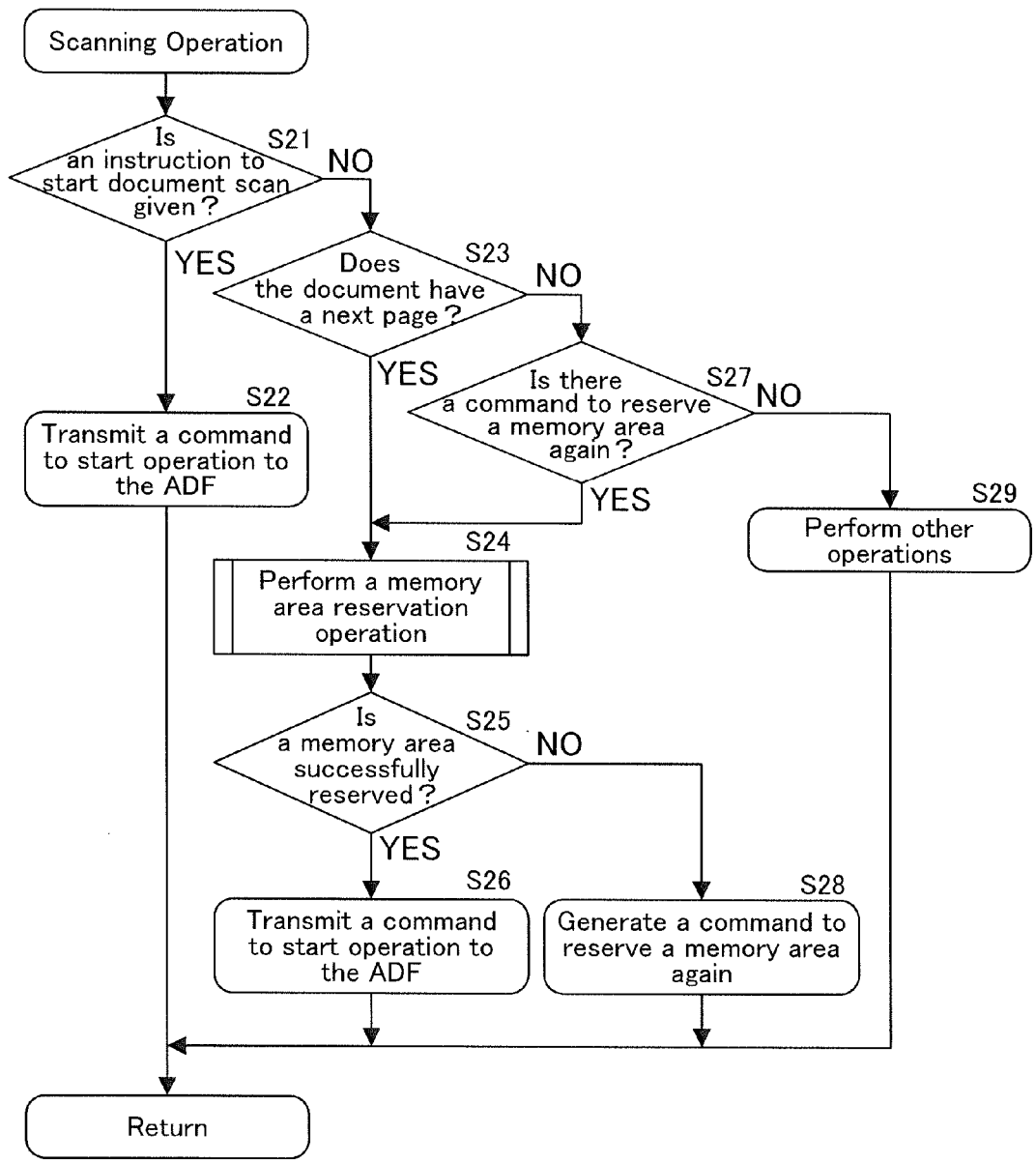
FIG. 9 is a flowchart representing a scanning operation to be performed by the image processing apparatus.

FIG. 9 is a flowchart representing a scanning operation to be performed through the scanner 11.

In Step S21, it is judged whether or not an instruction to start document scan is given. If an instruction to start document scan is given (YES in Step S21), a command to start operation is transmitted to the automatic document feeder (ADF) in Step S22. After that, the routine returns to the beginning. If an instruction to start operation is not given (NO in Step S21), then it is judged in Step S23 whether or not the document has a next page.

If the document has a next page (YES in Step S23), a memory area reservation operation for reserving a memory area is performed in Step S24. After that, it is judged in Step S25 whether or not a memory area is successfully reserved. The memory area reservation operation will be later described in details.

If a memory area is successfully reserved (YES in Step S25), a command to start operation is transmitted to the ADF in Step S26. After that, the routine returns to the beginning. If a memory area is not successfully reserved (NO in Step S25), a command to reserve a memory area again is generated in Step S28. After that, the routine returns to the beginning.

Back to Step S23, if the document does not have a next page (NO in Step S23), then it is judged in Step S27 whether or not there is a command to reserve a memory area again. If there is such a command (YES in Step S27), the routine proceeds to Step S24. If there is not a command to reserve a memory area again (NO in Step S27), other operations are performed in Step S29. After that, the routine returns to the beginning.

Figure 10:
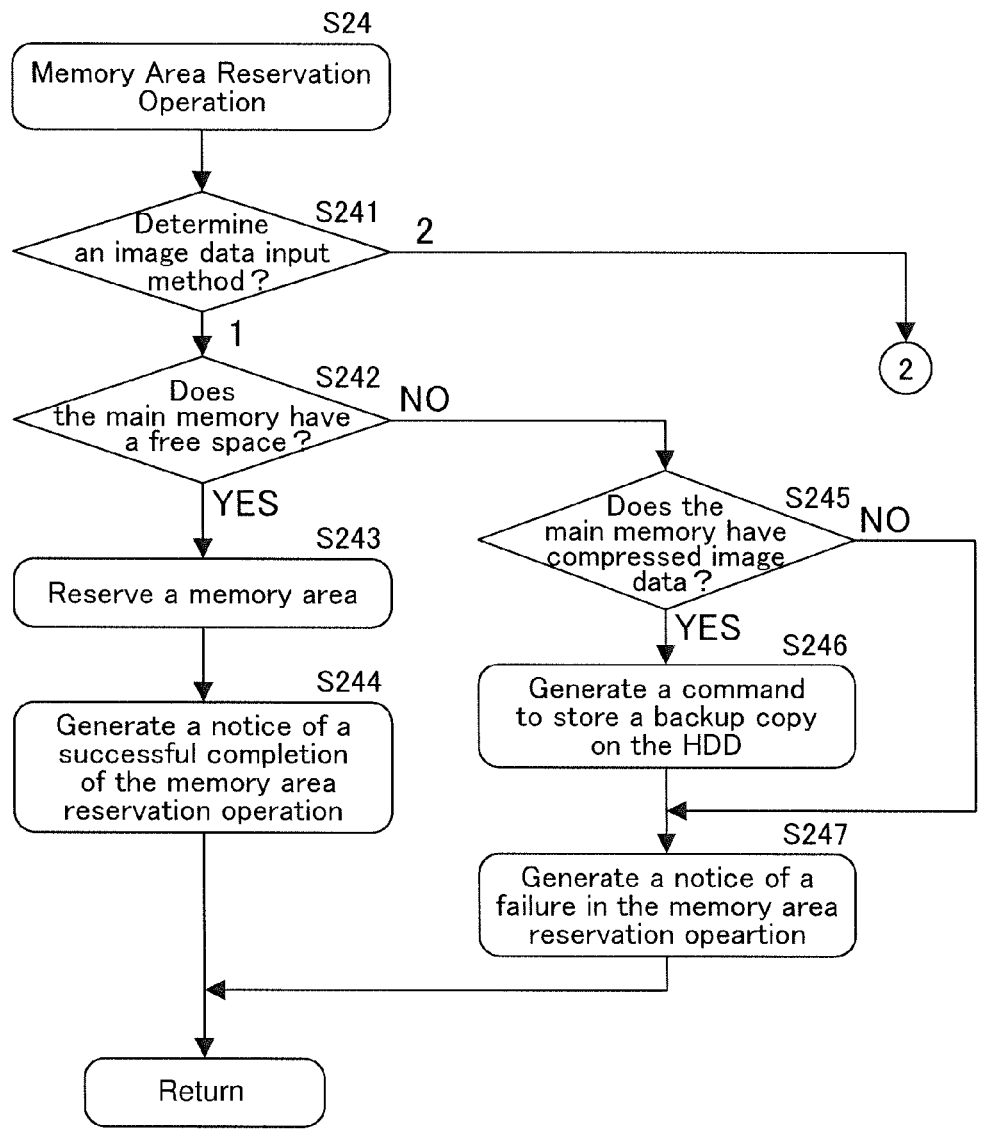
FIG. 10 is a flowchart representing a memory area reservation operation (Step S24) out of the flowchart of FIG. 9.

FIG. 10 is a flowchart representing a memory area reservation operation (Step S24) out of the flowchart of FIG. 9.

In Step S241, an image data input method is determined. If Input Method 1 is determined, then it is judged in Step S242 whether or not the main memory 107 has a free space. If it has a free space (YES in Step S242), a memory area equivalent to one page of image data is reserved in the main memory 107 in Step S243. In Step S244, a notice of a successful completion of the memory area reservation operation is generated. After that, the sub routine returns to the main routine.

Back to Step S242, if the main memory 107 does not have a free space (NO in Step S242), then it is judged in Step S245 whether or not the main memory 107 stores compressed image data. If the main memory 107 stores compressed image data (YES in Step S245), a command of storing a backup copy of the compressed image data on the non-volatile memory 12 is generated in Step S246. After that, the routine proceeds to Step S247. If the main memory 107 does not store compressed image data (NO in Step S245), the routine proceeds directly to Step S247. In Step S247, a notice of a failure in the memory area reservation operation is generated. After that, the sub routine returns to the main routine.

In Input Method 1, a memory area is reserved in the main memory 107 such that a plurality of pages of image data can be stored thereon, contributing to achievement of quick image inputs and document scans.

Figure 11:
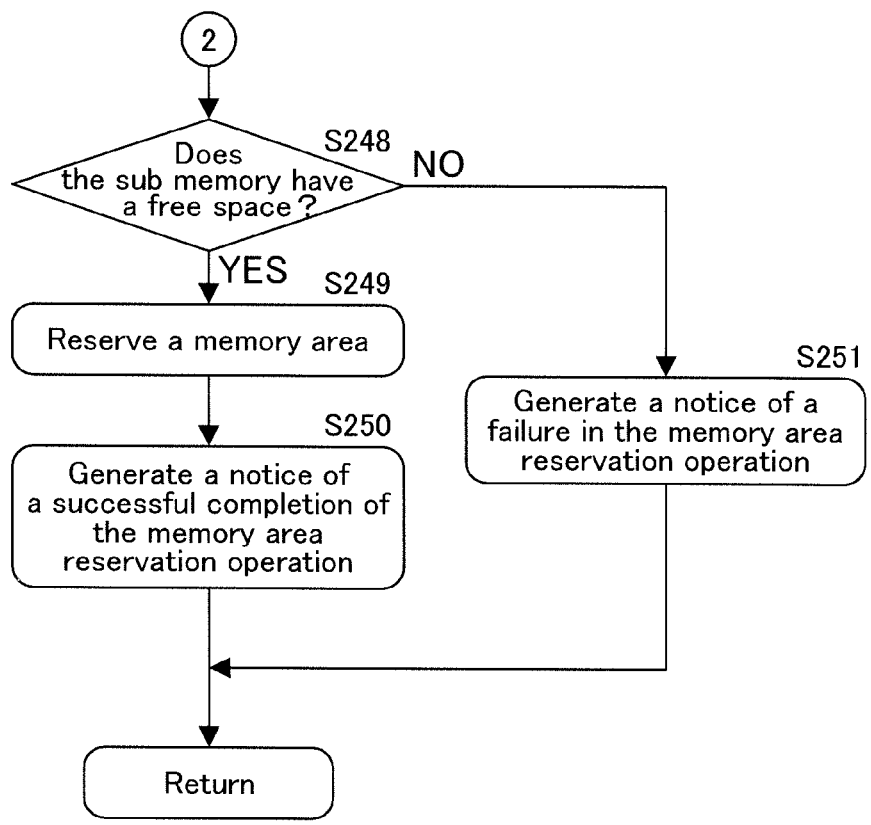
FIG. 11 is a flowchart continued from FIG. 10.

If Input Method 2 is determined in Step S241, then it is judged in Step S248 of FIG. 11 whether or not the sub memory 105 has a free space. If the sub memory 105 has a free space (YES in Step S23), a memory area equivalent to one page of image data is reserved in the sub memory 105 in Step S249. In Step S250, a notice of a successful completion of the memory area reservation operation is generated. After that, the sub routine returns to the main routine.

If the sub memory 105 does not have a free space (NO in Step S249), a notice of a failure of the memory area reservation operation is generated in Step S251. After that, the sub routine returns to the main routine.

Figure 12:
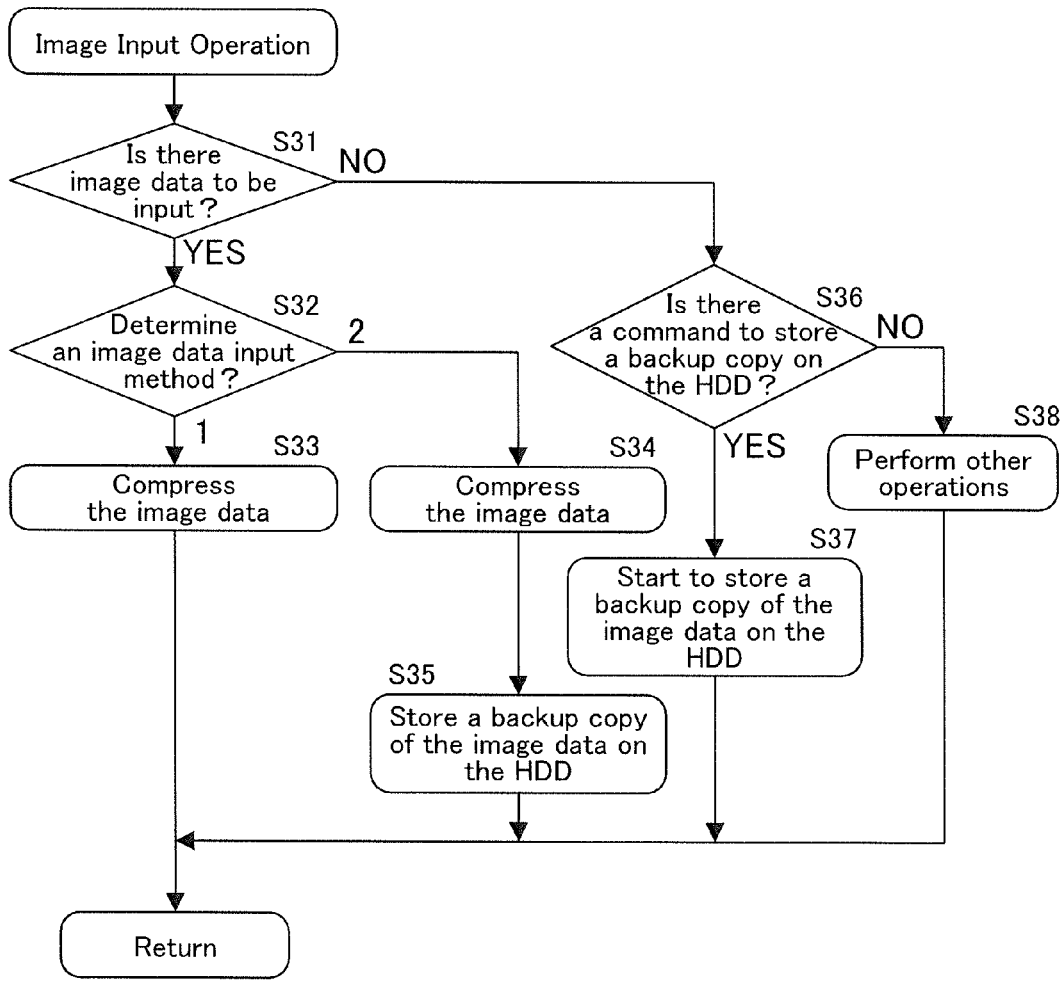
FIG. 12 is a flowchart representing an image input operation.

FIG. 12 is a flowchart representing an operation of inputting image data to store on the main memory 107 and the sub memory 105.

In Step S31, it is judged whether or not there is image data to be input. If there is such image data (YES in Step S31), an image data input method is determined in Step S32.

In Input Method 1, the routine proceeds to Step S33, in which: the image data is stored on the sub memory 105 and transferred to the compress and decompress portion 106 so as to be subjected to compression; and the compressed image data is stored on the main memory 107. After that, the routine returns to the beginning.

In Input Method 2, the routine proceeds to Step S34, in which the image data is stored on the sub memory 105 and transferred to the compress and decompress portion 106 so as to be subjected to compression. Subsequently, in Step S35, the compressed image data is stored on the main memory 107 and a backup copy of the compressed image data is stored on the non-volatile memory 12. After that, the routine returns to the beginning. Upon the backup on the non-volatile memory 12, the compressed image data is deleted from the main memory 107.

Back to Step S31, if there is no image data to be input (NO in Step S31), then it is judged in Step S36 whether or not there is a command to store a backup copy on the non-volatile memory 12. If there is such a command (YES in Step S36), a backup copy is started to be store on the non-volatile memory 12 in Step S37. If there is no such command (NO in Step S36), other operations are performed in Step S38. After that, the routine returns to the beginning.

In Input Method 1, a band buffer is formed in the sub memory 105 and the input image data is compressed and stored band by band on the main memory 107. There may be a need to reserve another memory in the main memory 107 space after storing the image data page by page on the main memory 107; in such a case, the memory area reservation operation starts from Step S246, in which a backup copy of the image data is stored on the non-volatile memory 12. In this case, the main memory 107 can store a plurality of pages of image data; thus this embodiment may be alternatively configured such that the input image data is stored on the main memory 107 without making a backup, which contributes to achievement of quick printings as well.

In Input Method 2, since a memory area capable of storing image data page by page is already allocated in the sub memory 105, the input image data is compressed and stored band by band on the main memory 107. In this case, the main memory 107 can store only one page of image data; thus a backup copy of one band of the image data is stored on the non-volatile memory 12 as soon as it is stored on the main memory 107, and a free space is reserved in the main memory 107 so as to prepare for printing.

In the above-described embodiment, a different image data input method is determined depending on the image processing mode and different sizes of memory area is reserved in the main memory 107 and the sub memory 105 depending on the image processing mode. Furthermore, image input is performed in a different manner depending on the determined image data input method the reserved sizes of memory area. In this way the image processing apparatus achieves quick image inputs without the need for a main memory of a large size and without sacrificing making full use of its resources.

While one embodiment of the present invention has been described in details herein and shown in the accompanying drawings, it should be understood that the present invention is not limited to the foregoing embodiment. For example, image data obtained from a document by the scanner 11 is input in this embodiment. Alternatively, image data received by a facsimile may be input.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   an image input portion that inputs image data page by page;
   a sub memory that stores the image data input by the image input portion;
   an encoder that encodes the image data stored in the sub memory;
   a main memory that stores the image data encoded by the encoder, the image data being stored in the sub memory;
   a non-volatile memory that stores the encoded image data, the encoded image data being stored in the main memory;
   a mode judgment portion that judges a current configured image processing mode comprising at least a resolution setting; and
   a controller that implements a first input method or a second input method depending on the judgment on the current configured image processing mode comprising at least the resolution setting, the judgment being obtained by the mode judgment portion,
   wherein the first input method comprises:
      storing a part of one page of image data in the sub memory, the image data being input by the image input portion;
      reserving a first memory area in the main memory, the first memory area being capable of storing the one page of image data;
      storing the one page of image data in the main memory, the image data being stored in the sub memory and encoded by the encoder; and
      reserving a second memory area in the main memory, the second memory area being capable of storing a next one page of image data, and wherein the second input method comprises:
      reserving a third memory area in the sub memory, the third memory area being capable of storing image data page by page, the image data being input by the image input portion;
      temporarily storing a part of image data in the main memory, the image data being stored in the sub memory and encoded by the encoder;
      storing a backup copy of the image data in the non-volatile memory, the image data being temporarily stored in the main memory; and
      deleting the image data temporarily stored in the main memory.

2. The image processing apparatus as recited in claim 1, wherein:
   the current configured image processing mode further comprises paper size and color mode settings, and is a combination of the resolution, the paper size, and the color mode settings; and
   the controller implements the first input method or the second input method depending on a combination of the judgments on the resolution, the paper size, and the color mode, the judgments being obtained by the mode judgment portion.

3. The image processing apparatus as recited in claim 2, wherein if the current configured image processing mode is a combination of a resolution judged to be equal to or higher than a predetermined level, a paper size judged to be equal to or greater than a predetermined size, and a color mode judged to be full-color, the controller implements the second input method and the third memory area reserved in the sub memory is capable of storing one maximum sized page of image data.

4. The image processing apparatus as recited in claim 2, wherein if the current configured image processing mode is a combination including at least one of a resolution judged to be lower than a predetermined level, a paper size judged to be smaller than a predetermined size, and a color mode judged to be monochrome, the controller implements the first input method and the first and second memory areas reserved in the main memory are collectively capable of storing two or more maximum sized pages of image data.

5. The image processing apparatus as recited in claim 2, wherein if the current configured image processing mode is a combination of a resolution judged to be high from among high, medium, and low, a paper size judged to be large from among large and small, and a color mode judged to be full-color from among full-color and monochrome, the controller implements the second input method, and the third memory area reserved in the sub memory is capable of storing one page of image data.

6. The image processing apparatus as recited in claim 2, wherein if the current configured image processing mode is not a combination of a resolution judged to be high from among high, medium, and low, a paper size judged to be large from among large and small, and a color mode judged to be full-color from among full-color and monochrome, the controller implements the first input method and each of the first and second memory areas reserved in the main memory is capable of storing two or more pages of image data.

7. The image processing apparatus as recited in claim 6, wherein:
    if the current configured image processing mode is a first combination or a second combination, the first combination being of a resolution judged to be high, a paper size judged to be small, and a color mode judged to be full-color, and the second combination being of a resolution judged to be medium, a paper size judged to be large, a color mode judged to be full-color, the first and second memory areas reserved in the main memory are collectively capable of storing two pages of image data;
    if the current configured image processing mode is a third combination of a resolution judged to be high, a paper size judged to be large, and a color mode judged to be monochrome, the first and second memory areas reserved in the main memory are collectively capable of storing three pages of image data; and
    if the current configured image processing mode is not the first combination, the second combination, or the third combination, the first and second memory areas reserved in the main memory are collectively capable of storing four or more pages of image data.

8. An image processing method for an image processing apparatus, the image processing method comprising:
    inputting image data page by page;
    storing the image data in a sub memory, the image data being input page by page;
    encoding the image data stored in the sub memory;
    storing the encoded image data in a main memory, the image data being stored in the sub memory;
    storing a backup copy of the encoded image data in a non-volatile memory, the encoded image data being stored in the main memory;
    judging a current configured image processing mode comprising at least a resolution setting; and
    implementing a first input method or a second input method depending on the judgment on the current configured image processing mode comprising at least the resolution setting,
    wherein the first input method comprises:
        storing a part of one page of image data in the sub memory, the image data being input;
        reserving a first memory area in the main memory, the first memory area being capable of storing the one page of image data;
        storing the one page of image data in the main memory, the image data being stored in the sub memory and encoded; and
        reserving a second memory area in the main memory, the second memory area being capable of storing a next one page of image data, and wherein the second input method comprises:
        reserving a third memory area in the sub memory, the third memory area being capable of storing image data page by page, the image data being input;
        temporarily storing a part of image data in the main memory, the image data being stored in the sub memory and encoded;
        storing a backup copy of the image data in the non-volatile memory, the image data being temporarily stored in the main memory; and
        deleting the image data temporarily stored in the main memory.

9. The image processing method as recited in claim 8, wherein:
    the current configured image processing mode further comprises paper size and color mode settings, and is a combination of the resolution, the paper size, and the color mode settings; and
    the first input method or the second input method is implemented depending on a combination of the judgments on the resolution, the paper size, and the color mode.

10. The image processing method as recited in claim 9, wherein if the current configured image processing mode is a combination of a resolution judged to be equal to or higher than a predetermined level, a paper size judged to be equal to or greater than a predetermined size, and a color mode judged to be full-color, the second input method is implemented, and the third memory area reserved in the sub memory is capable of storing one maximum sized page of image data.

11. The image processing method as recited in claim 9, wherein if the current configured image processing mode is a combination including at least one of a resolution judged to be lower than a predetermined level, a paper size judged to be smaller than a predetermined size, and a color mode judged to be monochrome, the first input method is implemented and the first and second memory areas reserved in the main memory are collectively capable of storing two or more maximum sized pages of image data.

12. The image processing method as recited in claim 9, wherein if the current configured image processing mode is a combination of a resolution judged to be high from among high, medium, and low, a paper size judged to be large from among large and small, and a color mode judged to be full-color from among full-color and monochrome, the second input method is implemented and the third memory area reserved in the sub memory is capable of storing one page of image data.

13. The image processing method as recited in claim 9, wherein if the current configured image processing mode is not a combination of a resolution judged to be high from among high, medium, and low, a paper size judged to be large from among large and small, and a color mode judged to be full-color from among full-color and monochrome, the first input method is implemented and the first and second memory areas reserved in the main memory are collectively capable of storing two or more pages of image data.

14. The image processing method as recited in claim 13, wherein:
   if the current configured image processing mode is a first combination or a second combination, the first combination being of a resolution judged to be high, a paper size judged to be small, and a color mode judged to be full-color, and the second combination being of a resolution judged to be medium, a paper size judged to be large, a color mode judged to be full-color, the first and second memory areas reserved in the main memory are collectively capable of storing two pages of image data;
   if the current configured image processing mode is a third combination of a resolution judged to be high, a paper size judged to be large, and a color mode judged to be monochrome, the first and second memory areas reserved in the main memory are collectively capable of storing three pages of image data; and
   if the current configured image processing mode is not the first combination, the second combination, or the third combination, the first and second memory areas reserved in the main memory are collectively capable of storing four or more pages of image data.

15. A non-transitory computer-readable recording medium having stored thereon an image processing program that is executable by a computer of an image processing apparatus to cause the computer to execute functions comprising:
   inputting image data page by page;
   storing the image data in a sub memory, the image data being input page by page;
   encoding the image data stored in the sub memory;
   storing the encoded image data in a main memory, the image data being stored in the sub memory;
   storing a backup copy of the encoded image data in a non-volatile memory, the encoded image data being stored in the main memory;
   judging a current configured image processing mode comprising at least a resolution setting; and
   implementing a first input method or a second input method depending on the judgment on the current configured image processing mode comprising at least the resolution setting,
   wherein the first input method comprises:
      storing a part of one page of image data in the sub memory, the image data being input;
      reserving a first memory area in the main memory, the first memory area being capable of storing the one page of image data;
      storing the one page of image data in the main memory, the image data being stored in the sub memory and encoded; and
      reserving a second memory area in the main memory, the second memory area being capable of storing a next one page of image data, and
   wherein the second input method comprises:
      reserving a third memory area in the sub memory, the third memory area being capable of storing image data page by page, the image data being input;
      temporarily storing a part of image data in the main memory, the image data being stored in the sub memory and encoded;
      storing a backup copy of the image data in the non-volatile memory, the image data being temporarily stored the main memory; and
      deleting the image data temporarily stored in the main memory.

16. The non-transitory computer-readable recording medium having the image processing program as recited in claim 15, wherein:
   the current configured image processing mode further comprises paper size and color mode settings, and is a combination of the resolution, the paper size, and the color mode settings; and
   the first input method or the second input method is implemented depending on a combination of the judgments on the resolution, the paper size, and the color mode.

17. The non-transitory computer-readable recording medium having the image processing program as recited in claim 16, wherein if the current configured image processing mode is a combination of a resolution judged to be equal to or higher than a predetermined level, a paper size judged to be equal to or greater than a predetermined size, and a color mode judged to be full-color, the second input method is implemented, and the third memory area reserved in the sub memory is capable of storing one maximum sized page of image data.

18. The non-transitory computer-readable recording medium having the image processing program as recited in claim 16, wherein if the current configured image processing mode is a combination including at least one of a resolution judged to be lower than a predetermined level, a paper size judged to be smaller than a predetermined size, and a color mode judged to be monochrome, the first input method is implemented and the first and second memory areas reserved in the main memory are collectively capable of storing two or more maximum sized pages of image data.

19. The non-transitory computer-readable recording medium having the image processing program as recited in claim 16, wherein if the current configured image processing mode is a combination of a resolution judged to be high from among high, medium, and low, a paper size judged to be large from among large and small, and a color mode judged to be full-color from among full-color and monochrome, the second input method is implemented and the third memory area reserved in the sub memory is capable of storing one page of image data.

20. The non-transitory computer-readable recording medium having the image processing program as recited in claim 16, wherein if the current configured image processing mode is not a combination of a resolution judged to be high from among high, medium, and low, a paper size judged to be large from among large and small, and a color mode judged to be full-color from among full-color and monochrome, the first input method is implemented and the first and second memory areas reserved in the main memory are collectively capable of storing two or more pages of image data.

21. The non-transitory computer-readable recording medium having the image processing program as recited in claim 20, wherein:
   if the current configured image processing mode is a first combination or a second combination, the first combination being of a resolution judged to be high, a paper size judged to be small, and a color mode judged to be full-color, and the second combination being of a resolution judged to be medium, a paper size judged to be large, a color mode judged to be full-color, the first and second memory areas reserved in the main memory are collectively capable of storing two pages of image data;

if the current configured image processing mode is a third combination of a resolution judged to be high, a paper size judged to be large, and a color mode judged to be monochrome, the first and second memory areas reserved in the main memory are collectively capable of storing three pages of image data; and if the current configured image processing mode is not the first combination, the second combination, or the third combination, the first and second memory areas reserved in the main memory are collectively capable of storing four or more pages of image data.

* * * * *